United States Patent
Madsen

(12) 
(10) Patent No.: US 6,362,874 B1
(45) Date of Patent: Mar. 26, 2002

(54) POLARIZATION MODE DISPERSION MEASUREMENT USING PHASE-SENSITIVE SIDEBAND DETECTION

(75) Inventor: Christi Kay Madsen, South Plainfield, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/779,392

(22) Filed: Feb. 8, 2001

Related U.S. Application Data

(60) Provisional application No. 60/187,630, filed on Mar. 8, 2000.

(51) Int. Cl.[7] ............................................. G01N 21/00
(52) U.S. Cl. ................................................. 356/73.1
(58) Field of Search ........................ 356/73.1; 385/24, 385/11, 123, 15, 16, 17, 20, 21, 23; 359/161, 140, 156, 122, 130

(56) References Cited

U.S. PATENT DOCUMENTS

| | | | |
|---|---|---|---|
| 6,130,766 A | * 10/2000 | Cao | 359/161 |
| 6,211,957 B1 | * 4/2001 | Erdogan et al. | 356/364 |
| 6,271,952 B1 | * 8/2001 | Epworth | 359/161 |

* cited by examiner

Primary Examiner—Frank G. Font
Assistant Examiner—Tu T. Nguyen
(74) Attorney, Agent, or Firm—Wendy W. Koba

(57) ABSTRACT

A polarization mode dispersion (PMD) measuring arrangement utilizes a tapped-off portion of a signal that has experienced dispersion (such as, for example, propagating through a dispersive optical fiber). The measuring arrangement utilizes a phase-sensitive single sideband detection circuit in conjunction with a polarization beam splitter to generate magnitude and phase information for the lower and upper sidebands of each polarization of the received signal. The magnitude and phase information collected at a single frequency can be used to determine the polarization mode dispersion, eliminating the need to sweep the center frequency of the received optical signal to generate the PMD measurement.

10 Claims, 3 Drawing Sheets

$\phi = ATAN(y/x)$

POLARIZATION MODE DISPERSION MEASUREMENT USING PHASE-SENSITIVE SIDEBAND DETECTION

CROSS REFERENCE TO RELATED APPLICATION

This application claims the priority of Provisional Application No. 60/187,630 filed Mar. 8, 2000.

TECHNICAL FIELD

The present invention relates to an optical communication system and, more particularly, to the utilization of a phase-sensitive detection arrangement on each sideband of a double sideband signal to measure polarization mode dispersion (PMD).

BACKGROUND OF THE INVENTION

Polarization mode dispersion (PMD) occurs in an optical fiber as a result of a small residual birefringence that is introduced in the fiber core by asymmetric internal stress or strain, as well as random polarization coupling due to external forces acting upon the fiber. Consequently, PMD may severely impair the transmission of a signal in an optical fiber-based network. There will be two polarization modes supported by a single mode transmission fiber. There is a group delay between these two eigen-modes, also knows as the principal states of polarization (PSP). If the input polarization is aligned with one of the PSPs, then the output polarization will remain in the same PSP. However, for arbitrary input polarizations, the output will consist of both PSPs, with a certain amount of delay (in time) between them. It is this differential group delay (DGD) that causes waveform distortion. In order to compensate for PMD, it is necessary to find the PSPs at the output so that a polarization splitter can be used to separate the two PSPS.

In the prior art, there are three basic categories of techniques used for polarization mode dispersion (PMD) compensation: (1) all-optical; (2) all-electrical; and (3) hybrid optical-electrical. For all-optical PMD compensation, the restoration of PMD distortion is performed optically and usually consists of a polarization converter coupled to a section of polarization maintaining fiber, or to a combination of a polarization converter, polarization beam splitter, a fixed and variable delay element and a combiner. The goal is to find the PSPs and align their axes to those of the PBSs. However, this is difficult to achieve since the principal states of polarization and the differential group delay (DGD) are not directly measured, and any optimization algorithm that is used to set the polarization converter and the variable delay element may converge to a local optimum or even fail to converge at all.

In a conventional all-electrical method, the distorted optical signal is first converted to an electrical signal at the receiver. A delay line filter with specific weights is then used to partially compensate for the distortion due to PMD. An exemplary hybrid technique may utilize a polarization controller and a section of polarization maintaining fiber. A high-speed photo-detector is used to convert the optical signal into an electrical representation. An electrical tapped delay line filter is then used to adjust the frequency-dependent phase of the electrical signal.

The widely-used modulation phase shift technique, as discussed in the article "Phase Shift Technique for the measurement of chromatic dispersion in optical fibers using LED's", by B. Costa et al., *IEEE Journal of Quantum Electronics*, Vol. 18, No. 10, pp. 1509–15 (1982), utilizes a double-sideband modulated signal and a swept carrier frequency to measure delay. The sidebands are required to exhibit the same amplitude and the change in delay and frequency must be accurately measured to obtain the dispersion parameter.

SUMMARY OF THE INVENTION

A need remaining in the prior art is addressed by the present invention, which relates to an optical communication system and, more particularly, to the utilization of a phase-sensitive detection arrangement on each sideband of a double sideband signal to measure polarization mode dispersion (PMD).

In accordance with the present invention, single-sideband self-homodyne signals are generated (or detected) and each sideband is separately processed to determine delay and dispersion information. By including a polarization beam splitter prior to the single sideband recovery, information on both principal states of polarization can be collected and then used to determine the polarization mode dispersion.

A narrowband optical filter is used to generate a signal including upper and lower sideband components from the received (and polarized) optical signal. The output form the narrowband filter is then used as an input to a phase-sensitive single sideband detector circuit which includes an RF signal generator, multipliers and phase shifter to form both in-phase and quadrature outputs. The magnitudes and phase of the output are used to form the dispersion information. By performing the detection on both polarizations, therefore, polarization mode dispersion information is obtained.

In a preferred embodiment, the narrowband optical filter includes a half-wave plate at its input and is used to process both polarizations of the optical signal, eliminating any discrepancies in the processed magnitude and phase information for each polarization.

Various and other embodiments of the present invention will become apparent, during the course of the following discussion and by reference to the accompanying drawings.

BRIEF DESCRIPTION OF THE DRAWINGS

Referring now to the drawings.

DETAILED DESCRIPTION

In accordance with the teachings of the present invention, by performing phase-sensitive sideband detection on an optical signal propagating through a dispersive element, such as an optical fiber, information can be collected regarding polarization mode dispersion (PMD) and this information used to correct/compensate for this dispersion. In order to fully understand the detailed aspects of the present invention, it is important to understand the mathematical details associated with characterizing the phase response of the dispersive element and, in general, the mathematical details associated with characterizing an optical transmission system.

Figure 1:
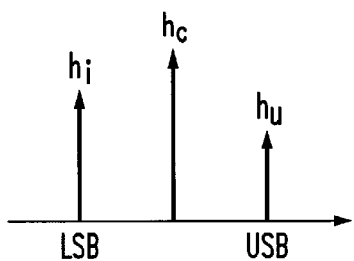
FIG. 1 illustrates, in a simplified diagram, the various sideband signals used to measure PMD information in accordance with the present invention.

In particular, the phase-sensitive technique of the present invention is based on decomposing the optical fiber (or other dispersive element) phase response into the sum of an even and odd function:

$$\phi(f_m) - \phi(0) = \phi_e(f_m) + \phi_o(f_m)$$

where the frequency $f_m$ is relative to the carrier frequency. To second order, the Taylor series expansion of the phase is given by:

$$\phi(f_m) - \phi(0) \approx -2\pi\tau f_m - \pi\lambda^2 f_m^2 D/c,$$

where in this expansion the odd function yields the relative delay $\tau$ and the even function yields the chromatic dispersion D (in ps/nm). FIG. 1 contains a diagram of the amplitudes for the center optical frequency signal, as well as the lower sideband (LSB) and the upper sideband (USB). As shown, the sidebands do not need to be equal (as was required in prior art arrangements). The sum and different of the sideband amplitudes can be defined as follows:

$$\Sigma = |h_c|(|h_u| + |h_L|)/2$$

$$\Delta = |h_c|(|h_u| - |h_L|)/2$$

Then, the in-phase (x) and quadrature (y) components can be defined as follows:

$$x = \Sigma \cos(\phi_e)\cos(\phi_o) - \Delta \sin(\phi_e)\sin(\phi_o)$$

$$y = \Sigma \cos(\phi_e)\sin(\phi_o) + \Delta \sin(\phi_e)\cos(\phi_o)$$

Using these results, the detected phases for a double sideband (DSB), an upper sideband (USB) and a lower sideband (LSB) can be expressed as follows:

$$\phi_{DSB} = \phi_o = \tan^{-1}(y/x)$$

$$\phi_{USB} = \phi_e + \phi_o = \tan^{-1}(y/x)$$

$$\phi_{LSB} = \phi_e - \phi_o = \tan^{-1}(y/x)$$

The sum of the sideband phases yields the even function in equation (1), that is, $\phi_e = (\phi_{USB} + \phi_{LSB})/2$, which characterizes the dispersion D. Similarly, the difference provides the odd function; $\phi_o = (\phi_{USB} - \phi_{LSB})/2$, which characterizes the delay $\tau$. Therefore, a single modulation frequency ($f_m$) can be used to provide the dispersion and delay information, eliminating the need to "sweep" the center frequency, as used in prior art arrangements.

Figure 2:
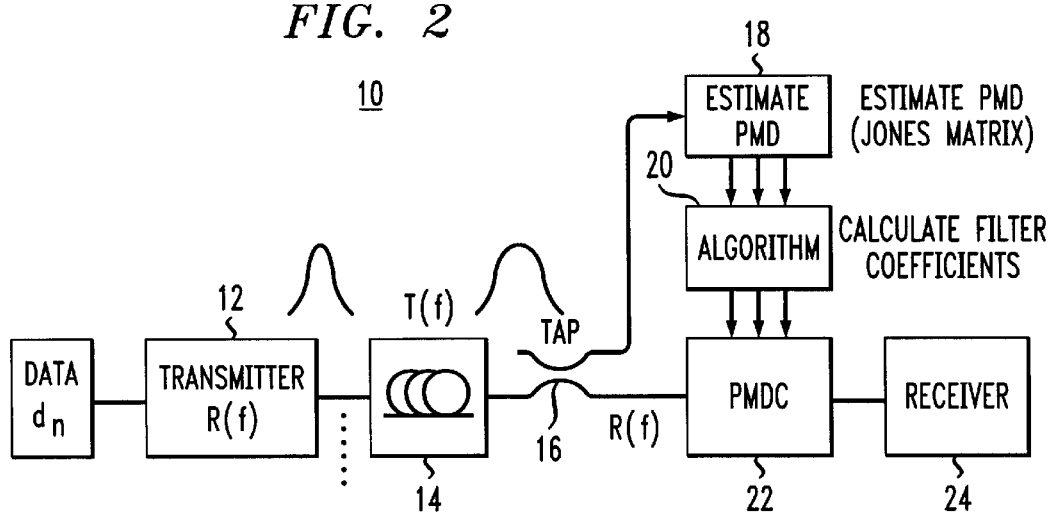
FIG. 2 contains a diagram of an exemplary optical transmission system utilizing a PMD measuring arrangement formed in accordance with the present invention.

FIG. 2 illustrates an exemplary optical communication system 10 that may employ the phase-sensitive single sideband PMD measurement technique of the present invention. In this particular arrangement, a data signal $d_n$ is impressed upon an optical transmitter 12 and is thereafter communicated through a dispersive element 14, in this case, an optical fiber. At some point along the transmission path (for example, at a receiver), the polarization mode dispersion introduced by fiber 14 is measured in accordance with the present invention and an appropriate compensation is introduced into the optical signal. As shown, an optical tap 16 is used to remove a portion of the signal experiencing PMD from the transmission path, where the tapped-off portion is applied as an input to an exemplary PMD measuring arrangement 18, formed in accordance with the present invention and described in more detail below. The output from PMD measuring arrangement 18, which will be indicative of the delay and dispersion present in the signal, is applied as an input to a filter coefficient module 20 which utilizes these values to determine the amount of correction needed to apply to the optical signal. A polarization mode dispersion compensator 22 is then used to introduce the desired amount of compensation so as to produce an optical output signal with minimal dispersion. Thereafter, the compensated signal may be applied as an input to an optical receiver 24 (as shown), or any other appropriate optical element (for example, an optical amplifier).

Figure 3:
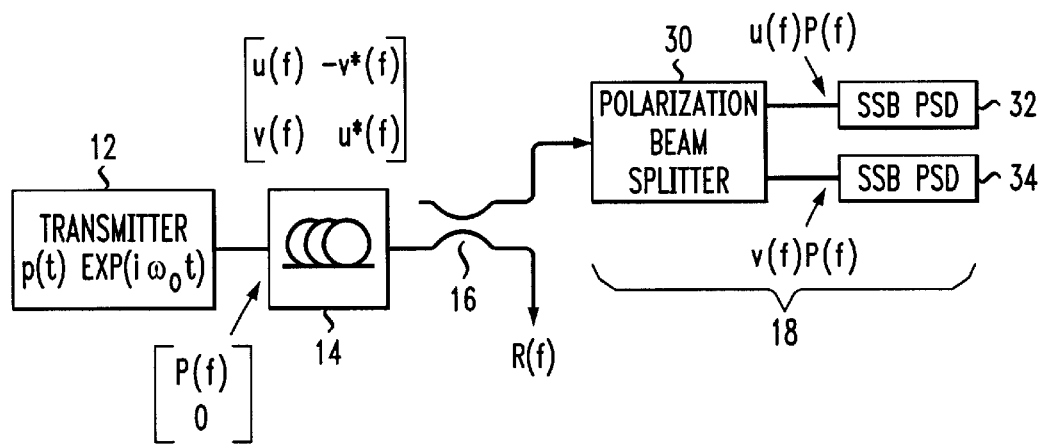
FIG. 3 illustrates in more detail the branch of the system of FIG. 2 that contains the PMD measuring arrangement, including a polarization beam splitter and pair of phase-sensitive single sideband detectors.

FIG. 3 illustrates transmitter 12 and optical fiber 14, as discussed above, in association with the particular elements comprising PMD measuring arrangement 18 as taught by this invention. Importantly, the output signal from optical fiber 14 is first passed through a polarization beam splitter 30, which separates the optical signal into the two orthogonal principal states of polarization, allowing for polarization dispersion to be properly measured. A first polarization state, defined as u, is then characterized within a first single sideband phase-sensitive detector 32. The remaining, orthogonal polarization v is similarly characterized within a second single sideband phase-sensitive detector 34. As will be described in detail below, the embodiment as shown in FIG. 3 can then be used to measure the dispersion (D) for each orthogonal polarization, measure the relative delay ($\tau$) between polarizations, and measure the magnitude of the USB and LSB components. As is known in the art, the PMD of optical fiber 14 (or any particular dispersive element) can be described by the Jones matrix:

$$M(f) = \begin{bmatrix} u(f) & -v^*(f) \\ v(f) & u^*(f) \end{bmatrix},$$

where $u(f) = U(f)\exp[j\phi_u(f)]$ and $v(f) = V(f)\exp[j\phi_v(f)]$.

Figure 4:
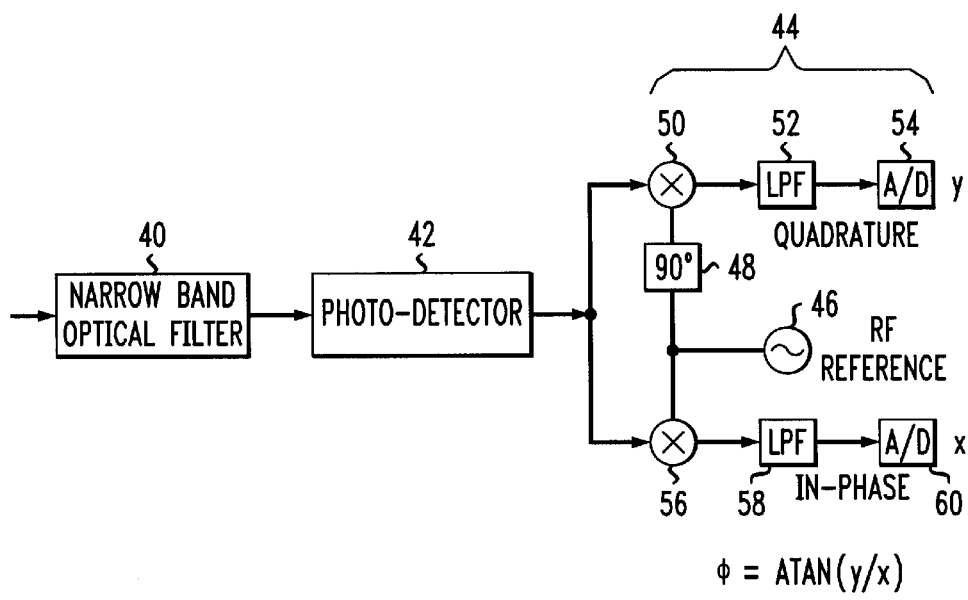
FIG. 4 contains a detailed diagram of an exemplary phase-sensitive single sideband detector.

In more particularity, an exemplary single sideband phase-sensitive detector 34 used in the arrangement of the present invention is illustrated in detail FIG. 4. Detector 34 comprises an optical filter 40 that is coupled to the output of polarization beam splitter 30 and used to generate/detect the separate sideband signals that are used to determine the delay and dispersion characteristics of the received signal. A particular detected sideband signal is subsequently transferred into the electrical domain by a photodetector 42 and passed through an RF modulator arrangement 44, as shown, to determine the in-phase and quadrature magnitude and phase components. RF modulator arrangement 44 comprises an RF reference source 46 (which may be associated with, for example, a local clock at a receiver, a local oscillator, or any suitable RF reference source). The RF signal, having a predetermined frequency (defined as $f_m$) is passed through a 90° phase shift element 48 and applied as a first input to multiplier 50, the remaining input being the electrical output from photodetector 42, the multiplier output forming the quadrature component of the received sideband signal. Thereafter, the quadrature component is passed through a low pass filter 52 and an A/D converter 54 to generate a first output component, denoted "y" in FIG. 4, and defined as the magnitude of the quadrature component of the processed sideband signal. Similarly, the RF signal is also applied as an input to a second multiplier 56, the remaining input being also the output from photodetector 42, the output of second multiplier 56 being the in-phase component of the received single sideband signal. The in-phase component is also passed through a low pass filter 58 and subjected to a conversion in A/D converter 60 to form the second output component, denoted "x" in FIG. 4 and defined as the magnitude of the in-phase component. The phase φ of this detected sideband is then defined by the relation $\phi=\tan^{-1}(y/x)$, as discussed above.

Figure 5:
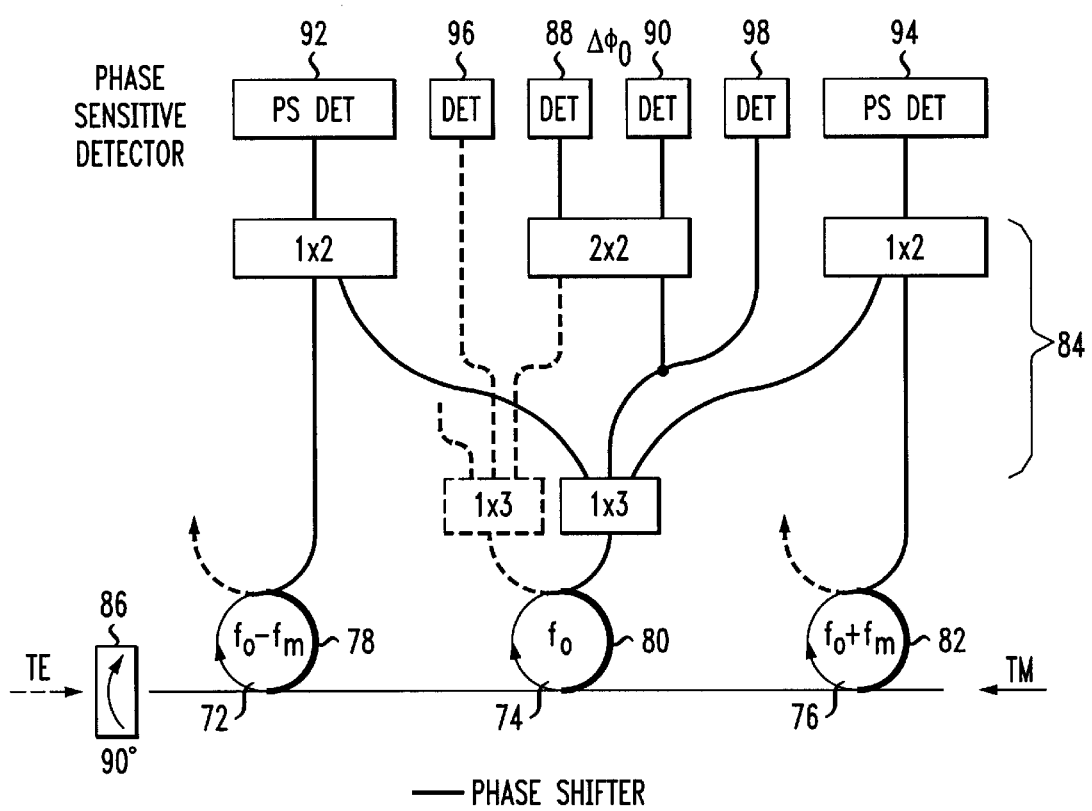
FIG. 5 illustrates an exemplary narrowband optical filter useful in detecting the single sideband components of a received data signal.

In one embodiment, measuring tones may be impressed on the data signal (or any appropriate "test" data signal sent through the transmission system and recovered as the sideband signals used for the PMD measuring purposes of the present invention. Advantageously, however, and as mentioned above, the data-loaded signal itself may be employed to generate the sideband signals (at the receiver) using a set of optical narrowband filters so that no modifications are required at the transmit end. FIG. 5 illustrates an exemplary narrowband filter arrangement 40 that may be interposed between the output of polarization beam splitter 30 and each phase-sensitive detector. In this particular embodiment, narrowband filter arrangement 40 comprises an integrated planar waveguide ring resonator circuit including three separate ring resonators 72, 74 and 76. Included within each resonator is a thermo-optic phase shifter, denoted 78, 80 and 82. A set of optical couplers 84, disposed at the outputs of each ring resonator, are configured in a compact manner to generate and combine the sidebands and carrier frequency. The sidebands are measured simultaneously, resulting in the ability to provide information quickly with little sensitivity to changes in the data spectrum or path length. The resonance of central ring 74 can be locked by dithering the ring's phase shifter 80 to optimize the detector carrier-frequency power. The resonances of sideband rings 72 and 76 are locked by optimizing the detected power at the local oscillator frequency. By including a half-wave plate 86, the same optical filter 40 may be used to provide phase detection for the orthogonal polarization output from beam splitter 30, as indicated by the dotted arrows and coupler shown in phantom in FIG. 5. With this arrangement, a pair of balanced detectors 88 and 90 at the output of center ring 74 may be measured to determine the phase difference between the orthogonal polarizations, Δφ(0), at the carrier frequency, as required for the calculation of the principal states of polarization from the estimated Jones matrix. Phase-sensitive detectors 92 and 94 (configured as discussed above in association with FIG. 4) provide the magnitude and phase information for the USB and LSB sidebands, respectively, while phase-sensitive detectors 96, 98 are used in conjunction with the center frequency component to provide the amplitude of the orthogonal polarizations.

As noted above, the sum of the sideband components characterize the dispersion present in the optical signal and the difference of the sideband components characterize the delay. By collecting this information for both polarizations, therefore, polarization mode dispersion can be completely characterized and the proper amount of compensation introduced into the optical system.

It is to be appreciated and understood that the specific embodiments of the present invention described hereinbefore are merely illustrative of the general principles of the invention. Various modifications may be made by those skilled in the art which are consistent with the principles set forth above. For example, various other arrangements may be used to implement a narrowband circuit capable of generating the required sideband signals. In general, the subject matter of the present invention is intended to be limited only by the scope of the claims appended hereto.

What is claimed is:

1. In an optical transmission system, a polarization mode dispersion measuring arrangement comprising
   a polarization beam splitter responsive to a tapped-off portion of an optical signal for dividing the signal into first and second orthogonally polarized signals;
   a narrowband filter, responsive separately to the first and second orthogonal signals, for generating therefrom a center frequency component, an upper sideband signal component and a lower sideband signal component for both said first and second orthogonal signals;
   a first phase-sensitive single sideband detector circuit, responsive to the components generated by the narrowband filter for the first orthogonally polarized signal and producing as an output magnitude and phase information for said first orthogonally polarized signal; and
   a second phase-sensitive single sideband detector circuit, responsive to the components generated by the narrowband filter for the second orthogonally polarized signal and producing as an output magnitude and phase information for said second orthogonally polarized signal, the combination of the outputs from the first and second phase-sensitive single sideband detector circuit forming the polarization mode dispersion measurement output of the arrangement.

2. The system as defined in claim 1 wherein each phase-sensitive single sideband detector circuit comprises
   a photodetector for converting the received optical signal into an electrical signal representation;
   an RF signal generator;
   a 90° phase shifter disposed at the output of the RF signal generator;
   a first multiplier, responsive at its separate inputs to the electrical signal output of the photodetector and the output of the 90° phase shifter, the output of the first multiplier being a quadrature component of the received signal;
   a first A/D converter, disposed at the output of the first multiplier, to generate a digital signal representation of the magnitude of the quadrature component, denoted as "y";
   a second multiplier, responsive at its separate inputs to the electrical signal output of the photodetector and the output of the RP signal generator, the output of the second multiplier being an in-phase component of the received signal;
   a second A/D converter, disposed at the output of the second multiplier, to generate a digital signal representation of the magnitude of the in-phase component, denoted as "x", wherein the phase φ of the processed optical signal is defined by the relation $\phi=\tan^{-1}(y/x)$.

3. The system as defined in claim 2 wherein each single sideband phase-sensitive detector circuit further comprises
   a first low pass filter disposed between the first multiplier and the first A/D converter; and
   a second low pass filter disposed between the second multiplier and the second A/D converter.

4. The system as defined in claim 2 wherein the RF signal generator comprises a local oscillator.

5. The system as defined in claim 2 wherein the RF signal generator utilizes a recovered clock signal.

6. The system as defined in claim 1 wherein the narrowband optical filter comprises
   a ring resonator structure including a set of three ring resonators, a first ring resonator for generating the center frequency component, a second ring resonator for generating the upper sideband component, and a third ring resonator for generating the lower sideband component, each ring resonator including a phase shifting element;

a plurality of optical couplers for combining the outputs of the set of three ring resonators to form the upper sideband, lower sideband and center frequency outputs of the narrowband filter.

7. The system as defined in claim 6 wherein the plurality of optical couplers comprises a first 2×1 optical coupler responsive to the outputs of the first and second ring resonators for forming the upper sideband output component; and a second 2×1 optical coupler responsive to the outputs of the first and third ring resonators for forming the lower sideband output component.

8. The system as defined in claim 6 wherein the narrowband optical filter further comprises a half-wave plate disposed at the input to the set of three ring resonators such that said narrowband optical filter can be used to generate the signal components for both the first and second orthogonally polarized signals.

9. The system as defined in claim 8 wherein the set of optical couplers further comprises a 2×2 for receiving as inputs the center frequency components of the first and second orthogonally polarized signals.

10. The system as defined in claim 9 wherein the optical filter further comprises a balanced detector for determining the phase difference between the center frequency components of the first and second orthogonally polarized optical signals.

* * * * *